United States Patent [19]  
Ebata et al.

[11] Patent Number: 4,682,754  
[45] Date of Patent: Jul. 28, 1987

[54] TURBINE PEDESTAL

[75] Inventors: Sakae Ebata; Nobuaki Ohshima, both of Hitachi, Japan

[73] Assignee: Hitachi, Ltd., Tokyo, Japan

[21] Appl. No.: 363,838

[22] Filed: Mar. 31, 1982

[30] Foreign Application Priority Data

Apr. 3, 1981 [JP] Japan ................................. 56-49454

[51] Int. Cl.⁴ ........................................... F16M 11/00
[52] U.S. Cl. ..................................... 248/639; 52/601; 248/679
[58] Field of Search ............... 248/677, 678, 679, 639, 248/346; 52/601, 252, 295, 296, 292

[56] References Cited

U.S. PATENT DOCUMENTS

| | | | |
|---|---|---|---|
| 1,794,079 | 2/1931 | Kellett | 52/252 |
| 2,731,824 | 1/1956 | Hadley | 52/252 |
| 2,733,029 | 1/1956 | Griffith | 52/296 X |
| 3,361,399 | 1/1968 | Hestand et al. | 248/679 |
| 3,379,397 | 4/1968 | Keady et al. | 248/678 X |
| 4,162,596 | 7/1979 | Damman | 248/679 X |
| 4,409,764 | 10/1983 | Wilnau | 52/252 X |

FOREIGN PATENT DOCUMENTS 577970 6/1958 Italy ..................................... 248/679  
951234 10/1956 Netherlands ........................ 248/678

Primary Examiner—J. Franklin Foss  
Assistant Examiner—David L. Talbott  
Attorney, Agent, or Firm—Beall Law Offices

[57] ABSTRACT

A turbine pedestal for supporting turbines and a generator installed in a generating plant is composed of a frame split into segments formed of concrete reinforcing steel platen and reinforced concrete as its main components. The turbine pedestal includes a deck of a concrete structure open only at the top and having reinforcements in addition to the platen arranged compactly in the vicinity of the top of the concrete as in a structure of the prior art, but less than the prior art in the vicinity of the sides and bottom due to the reinforcing affect of the platen. The segments of the frame formed of steel are prefabricated in the plant and have a shape and weight suitable for transportation to the site of construction. The segments of the frame are firmly connected together as by welding or interconnected through a concrete connection structure having compactly arranged reinforcements. In building the turbine pedestal, the frame segments prefabricated in the plant are transported to the site of construction, set in predetermined positions, and filled with concrete after reinforcements are arranged only in necessary portions.

12 Claims, 10 Drawing Figures

TURBINE PEDESTAL

BACKGROUND OF THE INVENTION

This invention relates to a turbine pedestal of an oil-fired or nuclear power generating plant.

It has hitherto been the usual practice to use a reinforced concrete structure for a turbine pedestal. Thus, building a turbine pedestal has been a time-consuming operation requiring 10 to 13 months to perform, because arranging reinforcements and depositing concrete have to be carried out repeatedly according to the concrete depositing process. After posts are completed, arranging reinforcements for a pedestal deck and setting anchor bolts are performed, before depositing concrete is completed.

SUMMARY OF THE INVENTION

This invention has as its object the provision of a turbine pedestal that requires a shortened period of time to build as compared with turbine pedestals of the prior art thanks to an alteration in the structure.

The outstanding characteristic of the invention enabling the aforesaid object to be accomplished is that the turbine pedestal according to the invention comprises a deck including an outer frame formed of steel open at its top and concrete deposited on the inner side of the outer frame with reinforcements compactly arranged in the vicinity of the top. Posts are formed of concrete deposited on the outer frame of steel and on the inner side of the outer frame.

In the concrete structure according to the invention, an internal arrangement of reinforcements considered necessary for obtaining satisfactory tensile strength in a reinforced concrete structure can be eliminated by surrounding the concrete with the outer frame of steel plates so that the steel plates will replace the internal arrangement of reinforcements. The absence of the outer frame from the top of the deck facilitates deposition of concrete through the top and enables a large number of anchor bolts for installing a turbine and a generator to be readily mounted. To compensate for a possible lack of strength that might be caused by the absence of the outer frame or steel plates from the top of the deck, reinforcements are arranged in the vicinity of the top of the deck as compactly as if no outer frame were provided. By arranging reinforcements as compactly as if no outer frame were provided is meant a usual arrangement of reinforcements at intervals of 10–20 cm, for example, that has been proposed for ordinary concrete structures.

In building the turbine pedestal according to the invention, steel plate box frame sections constituting the outer frame of steel plates are prefabricated in the plant and assembled by using a construction crane of large size in situ. Thus the steel plate box frame sections are of a size commensurate with the capacity of the construction crane used. The steel plate box frame segments are assembled and connected together in situ in such a manner that the frame segments are joined together by welding with regard to the posts and a concrete structure of the joints and an ordinary concrete structure referred to hereinabove are used with regard to the deck. By a combination of these operations, the period for building a turbine pedestal that has hitherto required 10–13 months has been shortened by 2–4 months.

DESCRIPTION OF THE PREFERRED EMBODIMENT

Figure 1:
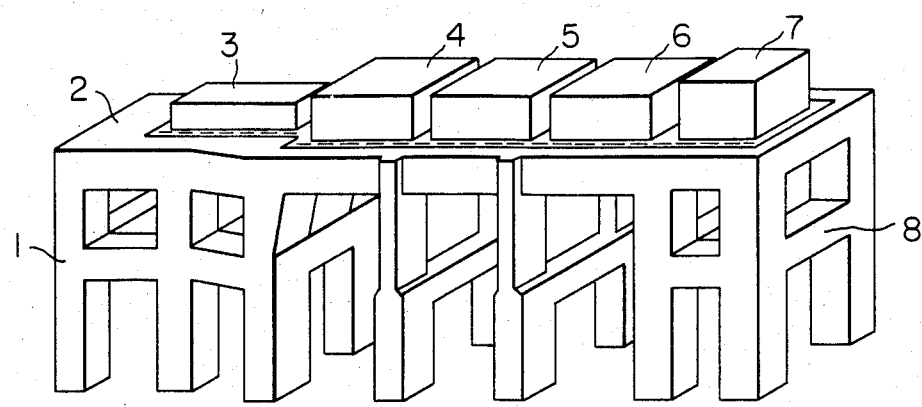
FIG. 1 is a schematic view of a turbine pedestal.

FIG. 1 shows a turbine pedestal in its entirety. The turbine pedestal comprises posts 1 and a deck 2. A governor 3, a high- and medium-pressure turbine 4 low-pressure turbines 5 and 6 and a generator 7 are installed on the pedestal 2. To enhance stability, the equipment 3, 4, 5, 6 and 7 is mounted in such a manner that it is partly suspended in an opening formed in the deck 2 to lower its center of gravity. Cross beams 8 are connected to the posts 1 in suitable positions, to thereby increase the strength of the turbine pedestal.

Figure 2A:
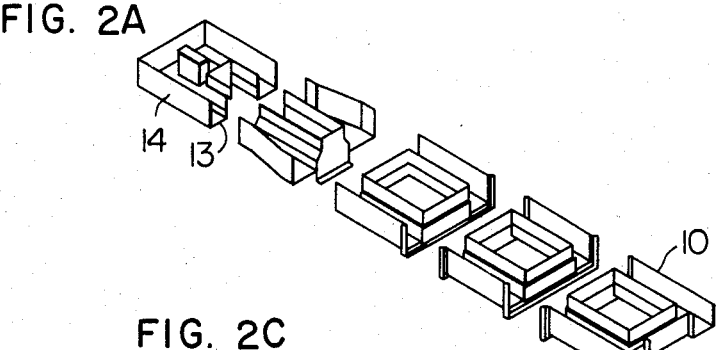
FIGS. 2A–2C show steel plate box frame segments divided into blocks.
Figure 2C:
Figure 2B:
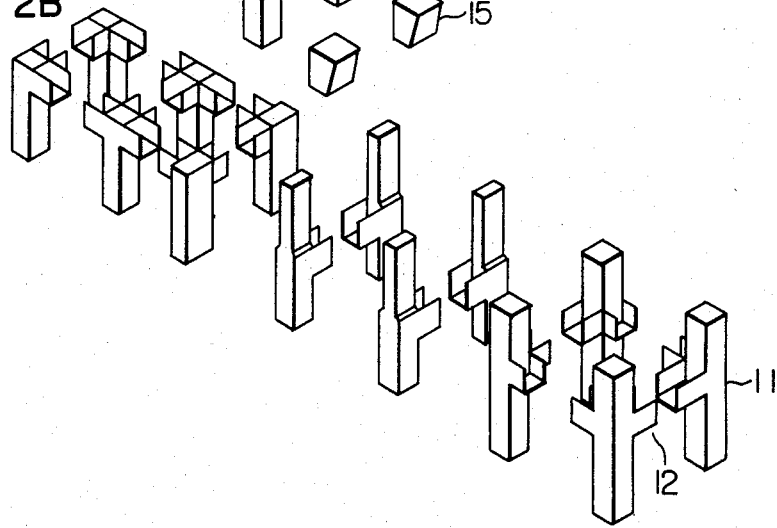

The turbine pedestal has its shell formed by frame segments 10, 11 and 12, of steel shown in FIG. 2, and its interior is charged with concrete. FIG. 2(A) shows the frame segments 10 of the deck 2, each including a bottom surface 13 and side walls 14, but open at the top. The deck 2 is composed of six frame segments 10 arranged in place in side by side relation. The number of frame segments 10 required for building the deck 2 is decided by the position of the posts 1 and weight of each frame segments 10 that match the capacity of the construction crane used. FIG. 2(B) shows the frame sections 11 for the posts 1 each including four side walls and open at the top and the bottom. The frame segments 12 of the cross beams 8 are connected to the frame sections 11 in suitable positions and each include a bottom surface and side walls as is the case with the frame section 10 of the deck 2. The frame segments 12 of the cross beams 8 do not each constitute a single cross beam but represent a half-portion of the cross beam. The two frame segments 12 are each connected to separate frame segments 11 of the post 1. FIG. 2(C) shows frame segments 15 for completing the posts 1 which each have four side walls and open at the top and the bottom, as is the case with the frame segments 11. The reason why the posts 1 each have additional connecting portions is because the frame segments 11 and 12 constituting the posts 1 and the cross beams 8 below the deck 2 are too heavy in weight to be handled by the construction crane. If the construction crane has a greater capacity, the need to split the posts 1 in segments could be eliminated. The additional connecting portions 15 are usually connected to the frame segments 11 for the posts 1 by butt welding in situ.

Figure 3:
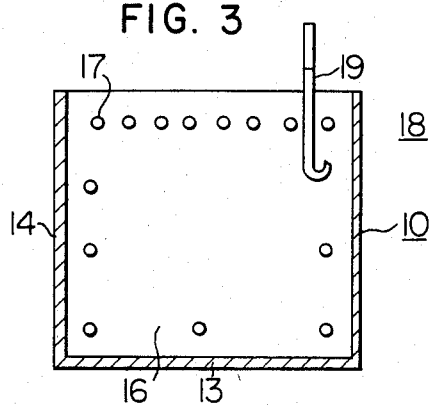
FIG. 3 is a fragmentary transverse sectional view of the deck.

FIG. 3 shows in a transverse cross-sectional view the deck structure in which concrete 16 is filled, as described hereinabove, on the inner side of the frame segment 10. The concrete 16 has reinforcements 17 arranged therein which are spaced apart from each other a distance 10–20 cm in the vicinity of the top of the deck 2 and a distance of over 50 cm on the sides and at the bottom. That is, the reinforcements 17 on the sides and at the bottom are intended to impart strength with respect to torsion while the reinforcements 17 near the top is intended to ensure that tensile strength is given to the structure, as is the case with structures of the priot art. As described hereinabove, the deck 2 is formed with an opening 18 for suspending the turbines 4-6 and the generator 7. The opening 18 has a large number of anchor bolts 19 embedded in an end portion of the opening 18 for installing the equipment. The frame segments 10 are formed of steel plates of 10-30 mm thick. The frame segments 11, 12 and 15 are also formed of steel plates of the same thickness as those forming the frame segments 10. No measures need be provided for coping with torsion to the posts 1, so that no reinforcements need be arranged in the concrete in the frame segments 11.

Figure 5:
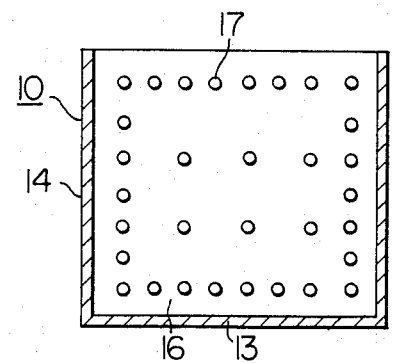
FIG. 5 is a sectional view taken along the line V—V in FIG. 4.
Figure 4:
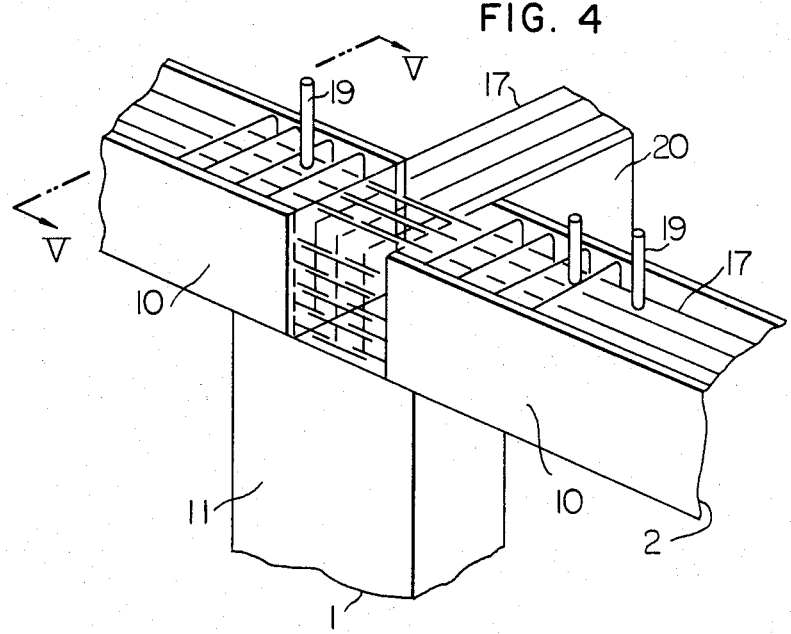
FIG. 4 shows in detail the post and the deck joints.

FIG. 4 shows in detail the joint between the post 1 and the deck 2. The joint is formed by placing the frame segments 10 for the deck 2 on the frame segment 11 for the post 1, the frame segments 10 and 11 being joined to each other by butt welding and the adjacent frame segments 10 being spaced apart a predetermined distance from each other. The space between the adjacent frame segments 10 accommodates any production errors that might be made and serves as a channel for flowing concrete into the interior of the frame segment 11 without closing the top of the frame segment 11 for the post 1 when the concrete is deposited. Thus the frame segments 10 lose the side walls 14 and the bottom 13 at the joint. To compensate for a lack of strength that might be caused by the lack of the frame segment 10 in the joint, the reinforcements 17 are arranged as compactly in the joint and its vicinity as in concrete structures of the prior art, as shown in FIG. 5. A crosspiece 20 for the deck 2 extends from the joint. The crosspiece 20 is formed at the bottom and opposite side walls of frame plates of steel and filled with concrete 16 in the interior. This reinforced structure is no different from the deck structure described hereinabove.

Figure 6:
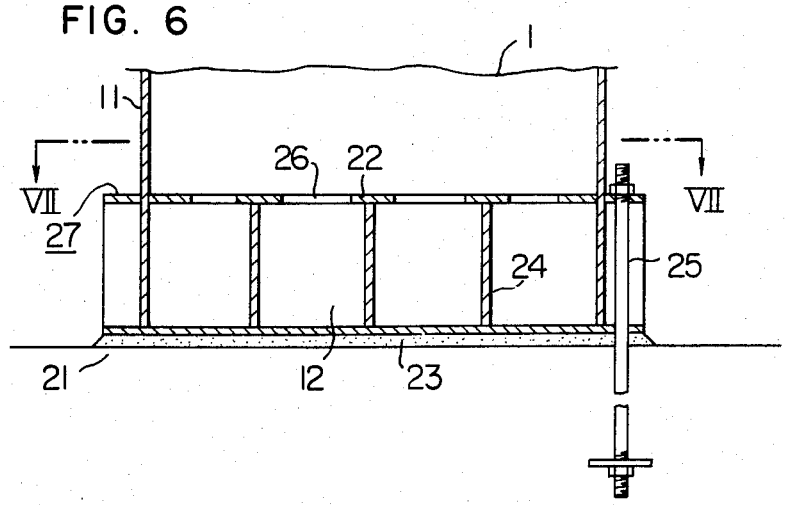
FIG. 6 shows the foundation of the turbine pedestal.
Figure 7:
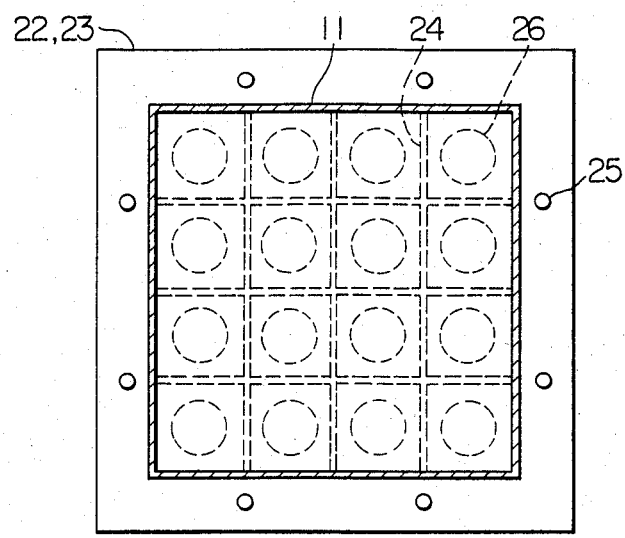
FIG. 7 is a sectional view taken along the line VII—VII in FIG. 6.

FIGS. 6 and 7 show the foundation of the turbine pedestal. The foundation comprises a shed foundation mat 21 and a connection 27 including two steel plates 22 and 23 arranged parallel to each other in predetermined spaced relation in horizontal planes, with lattice plates 24 arranged in vertical planes between the two steel plates 22 and 23 to increase strength. The connection 27 is secured to the foundation mat 21 by foundation bolts 25. The frame segments 11 for the post 1 and the connection 27 are constructed such that the frame segments 11 extend to the lower steel plate 23 and are joined thereto in steel-to-steel connection by welding. The upper steel plate 22 is formed with openings 26 to allow the concrete to reach the lowermost portion.

The construction of the turbine pedestal according to the invention has been described hereinabove. The process of building same is as follows.

Figure 8:
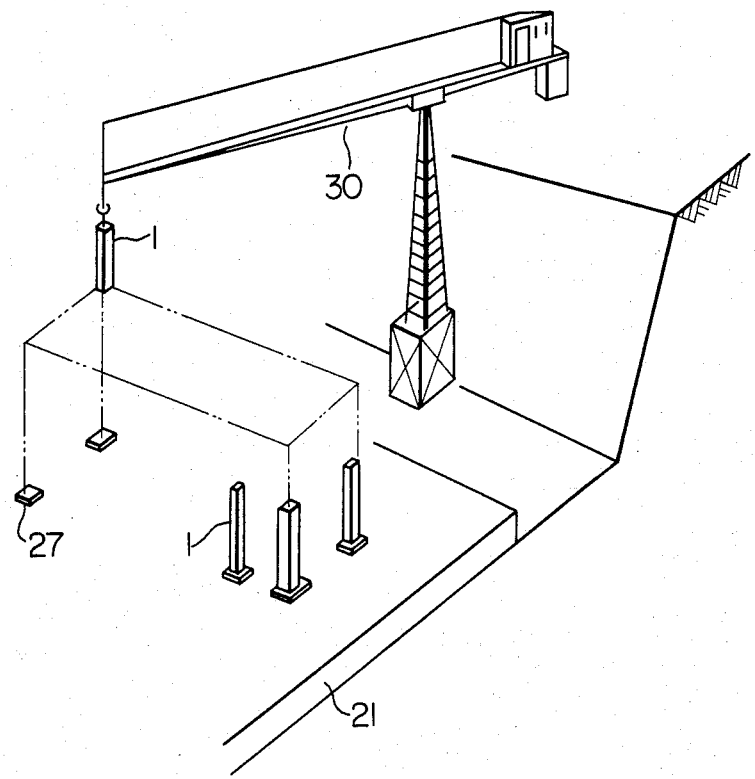
FIG. 8 is a view showing installing of the turbine pedestal in situ.

1. The connection 27, posts 1, deck 2, cross beams 12 and crosspieces 20 have their frame segments of steel prefabricated for each segment in a plant.
2. The frame segments completed in the plant are transported to the site of construction.
3. A construction crane 30 shown in FIG. 8 is employed for depositing the connection 27 on the shed foundation mat 21 in a predetermined position.
4. The frame segments for the posts 1 and cross beams 12 are set on the connection 27. The frame segments for the additional connecting portions are also set.
5. Following the aforesaid operations, the frame segments for the deck 2 and crosspieces 20 are set on the posts 1.
6. The operation of arranging the reinforcements 17 in the deck 2 is performed.
7. The anchor bolts 19 for installing the turbine, generator and other equipment are set. Concrete is pored through the opening at the top of the deck 2 to fill same in the connection 27, posts 1 and deck 2.
8. Concrete is pitched through the upper openings of the cross beams 12.
9. Painting of the turbine pedestal is performed. (Construction completed.)

The process of construction for building the turbine pedestal described hereinabove enables the operations performed at the site of construction to be minimized and allows the period of construction to be shortened by 2-4 months. Owing to the fact that fabrication of the structural members in the plant accounts for the major portion of the overall operation, the quality of the turbine pedestral can be improved.

It is possible to add some alterations to the aforesaid process of construction. For example, construction of the deck may be carried out by setting the foundation bolts and filling concrete for each frame segment at the site of construction to build the deck in sections which are later connected together into a completed deck. This enables the time required for concrete pitching to be further shortened.

What is claimed is:
1. A turbine pedestal comprising a deck and a plurality of posts for supporting the deck which in turn supports turbines and a generator, wherein the improvement resides in that:
   said posts each include an outer tubular frame formed of concrete reinforcing steel plate, and concrete deposited on the inner side of said outer frame so that said plates are a substantial part of the design concrete reinforcement of said posts; and
   a foundation including a plurality of steel plates arranged parallel to each other in predetermined spaced relation in horizontal planes, said outer frame of each post being firmly secured to each of two of said steel plates, and a plurality of vertically extending spacer elements secured between the steel plates.
2. A turbine pedestal as claimed in claim 1, wherein said two steel plates constituting the foundation are filled with concrete.
3. A turbine pedestal as claimed in claim 1, wherein said steel plates are 10-30 millimeters thick.
4. A turbine pedestal as claimed in claim 1, wherein said deck includes an outer frame formed of integral bottom and side concrete reinforcing steel plates in a U-shape that is open at the top, and concrete filling the inner side of said outer frame and having reinforcements in addition to said plates arranged more compactly in the vicinity of its top than its sides and bottom so that said plates are a substantial part of the design concrete reinforcement for the sides and bottom of said deck.
5. A turbine pedestal as claimed in claim 4, wherein said deck is formed with an opening for accommodating the turbines and the generator.

6. A turbine pedestal as claimed in claim 4 or 5, wherein said outer frame of said deck is split into a plurality of frame segments, and reinforcments are compactly arranged at the joints between the adjacent frame segments through the entire transverse surface of the deck.

7. A turbine pedestal as claimed in claim 4 or 5, wherein anchor bolts for installing the turbines and the generator are set in an opening at the top of the outer frame of the deck.

8. A turbine pedestal as claimed in claim 4, wherein said deck comprises:
cross beams provided between said posts each include said outer frame connected to said outer frame of said posts as a unit.

9. A turbine pedestal as claimed in claim 8, wherein the outer frame of each said cross beam is split into two segments between the posts.

10. A turbine pedestal as claimed in claim 4, wherein said steel plates are 10-30 millimeters thick.

11. A turbine pedestal as claimed in claim 10, wherein said reinforcements are steel rods that are spaced apart from each other a distance of about 10-20 centimeters in the vicinity of the top of the deck and a distance of over 50 centimeters on the sides and bottom of the outer frames forming the deck.

12. A turbine pedestal as claimed in claim 4, wherein said reinforcements are steel rods that are spaced apart from each other a distance of about 10-20 centimeters in the vicinity of the top of the deck and a distance of over 50 centimeters on the sides and bottom of the outer frames forming the deck.

* * * * *